United States Patent Office 3,139,433
Patented June 30, 1964

3,139,433
BIS-TETRACYCLINE DERIVATIVES
OF PIPERAZINE
Gyula Kollár, Lajos Sipos, and Gábor Pató, all of Budapest, Hungary, assignors to Chinoin Gyogyszer-Es Vegyeszeti Termekek Gyara Rt., Budapest, Hungary, a firm
No Drawing. Filed Mar. 28, 1962, Ser. No. 183,064
3 Claims. (Cl. 260—268)

It is generally known—see e.g. Austrian Patent No. 200,574—that tetracycline, resp. oxytetracycline may be submitted to Mannich's condensation by inducing their reaction with heterocyclic amines or alkyl-amines, etc. in the presence of formaldehyde, whereby products are obtained whose water solubility surpasses that of the tetracycline derivatives previously known. These products contain in every instance one molecule anti-biotic besides a molecule of the heterocyclic compound. At the preparation of injection liquids the solution of the products may be set according to the present patent to a neutral pH value by admixing addition compounds.

Now it was established that the derivatives of piperazine disubstituted with tetracycline or chlortetracycline grant without any further addition aqueous solutions as well biologically indifferent, excelling by their particular stability and low toxicity besides quick attainment of high blood level values and undiminished anti-biotical activity. These derivatives are produced, according to the invention, by reacting tetracycline resp. chlortetracycline with formaldehyde, suitably at a pH value between 4 and 12. The new compounds obtained possess the formula

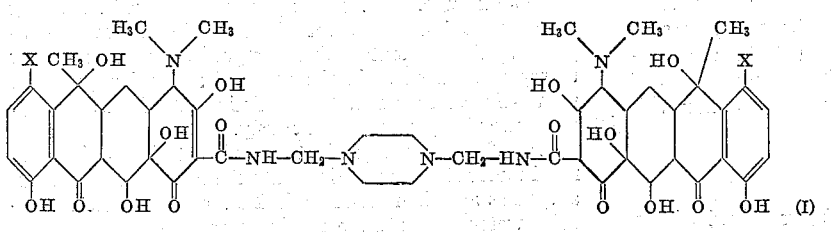

wherein X is selected from the group consisting of hydrogen and chlorine.

As evident, products are obtained containing 2 molecules of the anti-biotic besides one molecule piperazine, the piperazine being bound by the carboxamido-group of the antibiotic. The production process represents in consequence an Eichhorn condensation.

Using tetracycline as starting material the new compound is according to the Geneva nomenclature, the 1,4-bis - (4 - dimethylamino-1,4,4a,5a,6,11,12a-octahydro-3,6, 10,12,12a - pentahydroxy - 6 - methyl-1,11-dioxo-2-naphthacene - carboxamidomethyl) - hexahydro-diazine-(1,4). This composition was denominated by us as "pipercycline"; this denomination is used further in this specification.

The piperazine used as starting material may be applied in the form of the free base resp. in the form of a salt or hydrate (hexahydrate). Tetracycline resp. chlortetracycline likewise may be used in the form of the free base, the hydrate or of a salt.

An essential requirement of the converting process is the condition that the reaction mixture has to show a higher pH value than the value corresponding to the second dissociation constant of the piperazine. This pH value can be secured by adding a tertiary amine or an inorganic base. The pH value required may also be attained by using an excess of piperazine, for at pH values over 5 the disubstituted product maintains its stability even in the presence of an excess of piperazine.

Carrying out the process according to the invention, favourably 1.2–1.8 moles formaldehyde are used calculated for 1 mole of the antibiotic, at the temperature of 30–60° C.

Alcohols and especially n-butanol may be used as medium. Using these solvents satisfying yields and good quality of the final products will be achieved.

The process according to the invention may also be carried out in the presence of carboxylic acids, preferably at a pH value between 4 and 7. In this case salts of the new compound are obtained, that are, in consequence of their high stability, eminently suitable for the preparation of injection liquids destined for intravenous administration. Yet the product may also be converted into the suitable salt after being isolated off the reaction mixture. It is also possible to use the product effectively for the preparation of injection liquids without conversion into some salt, because its aqueous solution presents a pH value corresponding even without addition of alien substances to the biological pH value.

At the process carried out in the presence of organic acids mono-, di- or tricarboxylic acids, suitably malic acid, succinic acid, tartaric acid, glutaminic acid, citric acid, malonic acid, glutaric acid or adipinic acid may be used.

The compositions prepared according to the invention may be further processed in the well-known manner for the purpose of immediate therapeutical application. In this manner e.g. tablets, coated pills, powder mixtures, suppositories, etc. may be prepared. A particularly advantageous application of the compound is its use for the preparation of injection liquids destined for intravenous administration. Injections to be administered intramuscularly and subcutaneously are remarkable for the painless treatment.

More particulars of the process are shown in the examples.

*Example 1*

100 grs. tetracycline hydrate (18% $H_2O$) are dissolved at 45–50° C. in 1.200 grs. n-butanol. The solution is filtered with charcoal, then while continually stirred at 45–50° C., 25 millilitres of a 40% formaldehyde solution

3 is added to the clarified solution. Hereupon 40 grs. piperazine hexahydrate dissolved in 200 milliliters n-butanol are added. The product being insoluble in n-butanol, precipitates immediately off the reaction mixture. After 25 minutes' stirring at 45–50° C. the reaction is terminated, whereupon the reaction mixture gets cooled to 10–15° C. and filtered on a suction filter. The formed bright yellow precipitate is washed with n-butanol and then several times with ether, finally dried at 50° C. under reduced pressure. 95 grs. pipercycline of 6.5% water content are obtained (96% of the theoretical yield). Melting point: 176–180° C. (decomposition). Easily soluble in water. Insoluble in alcohol and ether. The pH value of the 10% aqueous solution amounts to 7.35. The water solubility at room-temperature lies above 1 gr./ml. The solution obtained is absolutely clear. Analysis: N, 8.31%, 8.45% (calculated, 8.41%); C, 55.37%, 55.65% (calculated, 56.0%). The biological activity is equivalent of 954 mcg./mg. tetracycline HCl. The toxicity on mice amounts to $LD_{50}=113$ mg./kg. body weight.

This product is particularly well suited for the preparation of intravenous injections. In the case of intramuscularly and hypodermically administered injections painless treatment is attained.

The structure of this compound was established by the following method:

10 grs. of the product are dissolved in 100 millilitres distilled water, then 3 grs. sodium metabisulfite admixed and the pH value of the solution adjusted to 4.4 with 5 n-$H_2SO_4$. The solution is stirred at room-temperature for an hour, thereafter the precipitated bright yellow crystalline product filtered, washed with acetone and ether and dried overnight under reduced pressure. 9 grs. of a bright yellow crystalline substance will be obtained that may be identified according to the well-known methods, proving itself to be tetracycline hydrate. The mother liquor of the reaction mixture is alkalinized with NaOH and extracted several times with ether. The etheric extract is dried over $Na_2SO_4$, then after the introduction of hydrochloric acid, the solvent is evaporated. An oily residue is left behind that can be crystallized from the mixture of methanol and isopropyl acetate and that has its melting point at 252–253° C. This melting point fits in well with the melting point of 1,4-dimethyl-piperazine-hydrochloride known from the literature. The structure of the compounds obtained by reduction verifies the correctness of the hypothetical structure for the products obtained according to the invention. The reductive decomposition of the compound may be carried out in aqueous solution with ascorbinic acid as well.

*Example 2*

10 grs. tetracycline hydrate (18%) are mixed with a solution of formaldehyde under the same conditions as in Example 1, hereupon the pH value of the reaction mixture carefully set to 6.5–7.0 with a 4% solution of potassium hydroxide. Then the solution of 2 grs. piperazine hydrate in 12 millilitres n-butanol is admixed and stirred for 25 minutes at 45–50° C. After cooling the precipitate is filtered off, washed with alcohol, ether and dried. 9.2 grs. pipercycline are obtained. Melting point: 176–180° C. (decomposition). The pH value of the 10% aqueous solution amounts to 7.45. N=8.3%. The biological activity equals to 944 mcg./mg. tetracycline HCl.

4

*Example 3*

60 grs. tetracycline hydrate are dissolved at 50–52° C. in 900 millilitres n-butanol. To the solution 15 millilitres of a 37% solution of formaldehyde is admixed and then the solution of 24 grs. piperazine hexahydrate in 150 millilitres n-butanol as well as the solution of 9 grs. malic acid in 140 millilitres n-butanol added while constantly stirred. Every solution has to be filtered over a G–4 filter for purification before use. The reaction mixture thereafter is stirred for 25 minutes at 50–52° C. and then cooled down to 15–20° C. The bright yellow precipitate formed in the course of the reaction is filtered and then washed with n-butanol and ether dried under reduced pressure. 75 grs. of the salt formed by pipercycline with malic acid will be obtained. Melting point: 152–154° C. (decomposition). Analysis: C, 55.8–56.04%; N, 7.29–7.02%; H, 6.54–6.72%. Biological activity: 806 μg./mg. Toxicity: $LD_{50}=190$ mg./kg. body weight (on mice). Solubility in water: in 1 millilitre water dissolve 1.4 grs. of the substance. pH value of a 10% aqueous solution: 6.12.

The product proves paper-chromatographically to be homogeneous. Placed in powder-ampoule no alteration of the substance was observed even after a 3 months' storage.

*Example 4*

5 grs. chlortetracycline-hydrochloride (melting point 205° C., decomp.) are suspended in 100 millilitres methanol and then the solution of 1 gr. piperazine in 10 millilitres methanol added. The reaction mixture is heated to 45° C., decolorized with animal charcoal and decomposed at 50° C. by 1.2 millilitres of a 40% formaldehyde solution. The reaction mixture hereafter is stirred at 50° C. for 25 minutes and allowed to stand at +5° C. overnight. The deposited precipitate is filtered and washed with methanol and ether, then dried under reduced pressure. 4 grs. of the N-carboxamide-derivative of N,N'-bis-methyl-piperazine and chlortetracycline will be obtained. Melting point: 197–200° C. (decomposition). The product is soluble in water, the pH value of the 5% aqueous solution amounts to 6.9. N: 7.85% (calculated: 8.14). The biological activity equals to 880 mcg./mg. chlortetracycline HCl.

*Example 5*

0.25–0.5 resp. 1 gr. of the product prepared according to Example 1 are filled into 5–10 millilitres powder-ampoules. The content of these ampoules may be used for therapeutic purposes in the form of a solution prepared with 2–5 ml. sterile dist. water, administered intravenously, intramuscularly or subcutaneously.

0.1–0.5 gr. of the product according to Example 1 are filled under sterile conditions into 5–20 millilitres powder-ampoules and then dissolved in 2–20 millilitres sterile distilled water, for ophthalmologic purposes.

1.0 gr. of the product according to Example 1 is filled together with 0.4 gr. sterile, crystallinized maleic acid in a sterile manner into 5 millilitres powder-ampoules. The preparation is used after being dissolved in 2 millilitres sterile distilled water for the purpose of injections to be administered intravenously, intramuscularly or hypodermically. The content of the ampoule dissolves immediately, without shaking, forming a clear solution.

What we claim is:

1. The water soluble tetracycline derivatives of the formula

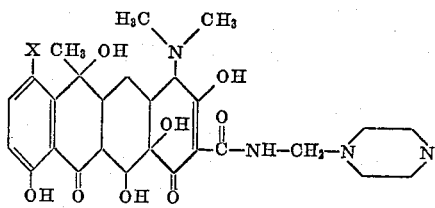
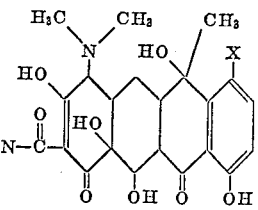

wherein X is selected from the group consisting of hydrogen and chlorine.

2. The compound 1,4-bis-(4-dimethylamino-1,4,4a,5,5a,6,11,12a - octahydro - 3,6,10,12,12a - pentahydroxy - 6-methyl - 1,11 - dioxy - 2 - naphthacene-carboxamido-methyl)-hexahydrodiazine-(1,4).

3. The compound 1,4-bis-(7-chloro-4-dimethylamino-1,4,4a,5,5a,6,11,12a - octahydro - 3,6,10,12,12a - pentahydroxy - 6 - methyl - 1,11-dioxy-2-naphthacene-carboxamido-methyl)-hexahydro-diazine-(1,4).

References Cited in the file of this patent

UNITED STATES PATENTS 2,997,471 Cheney et al. _____ Aug. 22, 1961

FOREIGN PATENTS 227,105 Australia _____ Apr. 3, 1958
233,781 Australia _____ July 23, 1959
1,088,481 Germany _____ Sept. 8, 1960